United States Patent [19]

Robbart

[11] Patent Number: 4,551,385

[45] Date of Patent: Nov. 5, 1985

[54] METHOD FOR PRINTING CELLULOSIC SUBSTRATES USING MODIFIED REACTIVE SILOXANES TO FORM AN OLEOPHILIC LAYER THEREON AND IMPREGNATING THEREAFTER WITH AN INK

[76] Inventor: Edward Robbart, 15 Emerson Pl., Boston, Mass. 02115

[21] Appl. No.: 552,315

[22] Filed: Nov. 16, 1983

[51] Int. Cl.[4] ........................ B32B 5/16; C23C 11/00

[52] U.S. Cl. .................................. 428/323; 428/328; 428/452; 428/447; 428/448; 428/454; 428/537.5; 428/533; 428/498; 427/255.1; 427/255.4; 427/255.6; 101/426

[58] Field of Search ............... 428/452, 447, 448, 454, 428/323, 328, 537.5; 427/255.1, 255.4, 255.6, 205; 101/426

[56] References Cited

U.S. PATENT DOCUMENTS

| | | | |
|---|---|---|---|
| 3,856,558 | 12/1974 | Robbart | 427/255.1 X |
| 4,049,860 | 9/1977 | Armbrust et al. | 428/452 X |
| 4,064,312 | 12/1977 | Crystal | 428/452 X |

*Primary Examiner*—Patrick C. Ives
*Attorney, Agent, or Firm*—Jerry Cohen; M. Lawrence Oliverio

[57] ABSTRACT

Modified reactive siloxanes are chemically bonded directly to the surface of a cellulosic substrate to form an oleophilic layer of siloxane on the cellulosic substrate and a conventional ink impregnates the oleophilic siloxane to effect printing thereon.

14 Claims, No Drawings

METHOD FOR PRINTING CELLULOSIC SUBSTRATES USING MODIFIED REACTIVE SILOXANES TO FORM AN OLEOPHILIC LAYER THEREON AND IMPREGNATING THEREAFTER WITH AN INK

FIELD OF THE INVENTION

This invention relates to an improved printing process and printed products therefrom. More particularly, this invention relates to improving the printing characteristics of cellulosic materials and providing novel printed products exhibiting improved properties.

BACKGROUND OF THE INVENTION

In the development of the technology of printing, considerable effort has been devoted to methods for improving the characteristics of the substrate to be printed. There are two main factors to consider in the printing of papers by any printing process; these are "runnability" and "print quality". Runnability is defined as the ability to get the sheet through the press and is important because failures in runnability cause expensive downtime on the presses. The following sheet characteristics have been found to affect runnability:

(a) Flatness, freedom from buckles, puckers, wave, and curl;
(b) Trimming;
(c) Dirt;
(d) Moisture Content or pH;
(e) Adequate pick resistance;
(f) Adequate water resistance;
(g) Paper-ink relationship;
(h) Mechanical condition.

Print quality is the effect of the paper on the accurate reproduction of the image form to be printed. The significant paper properties effecting print quality are:

(a) Color;
(b) Brightness;
(c) Opacity;
(d) Smoothness;
(e) Gloss
(f) Refractiveness.

Of particular interest for letterpress printing are:

1. Smoothness
2. Levelness
3. Cushion
4. Ink Receptivity

To some degree, the runnability characteristics for gravure printing are considerably less stringent though the printing characteristics listed above continue to be significant.

Improvement in sheet characteristics allows greater variability in printing processes, in ink formulations, and may result in substantial improvement in image quality, economies in processing, or both. Essentially, in the case where printing is to be accomplished on a cellulosic sheet, a modification of the balance between the oleophilic and hydrophilic functionalities of the cellulose molecule has been found useful. Heretofore, improvements in sheet characteristics have been achieved through the use of additives or coatings in the manufacture of many printing or packaging grades of paper. Typical additives such as rosin, alum and the like or typical coatings such as those comprised of starch, clay, appropriate binders and brighteners, are often employed to assist printability and runnability of the substrate. These techniques are frequently costly and cumbersome and often fall wide of the mark of producing an ideal printing substrate.

For certain grades of substrates, in particular newsprint, present techniques of production and factors of the marketplace militate against the suitability of these techniques for modifying the sheet. Further, with respect to newsprint, efficiencies of operation have favored the use of web offset printing systems whose more stringent runnability requirements are barely met by newsprint as presently produced. Linting and inadequate water resistance can result in sheet breaks causing downtime and other problems of press operation.

Some producers of newsprint have installed twin-wire formers whose purpose is to produce a sheet with uniform wire and felt sides. These machine modifications are costly and involved and yet they may result in a sheet whose runnability, while improved, is far from ideal.

It is an object of the present invention to improve the printing characteristics of cellulosic substrates by a process which is eminently compatible with present manufacturing practices.

Another object of the invention is to provide a printing process of improved runnability and printing quality.

Yet another object of the invention is to provide printed products characterized by improved imaging, reduced strike-through, mottling and ink usage, faster drying and reduced linting.

SUMMARY OF THE INVENTION

These and other objects of the invention are obtained by, prior to printing onto at least one surface of a cellulosic substrate, forming a deposit of siloxane and polymers thereof on and integral with the surface onto which the printing is effected.

The improved articles of manufacture provided by the process of the invention comprise a cellulosic substrate having on and integral with at least one surface thereof a deposit of siloxane and polymers thereof and printing ink applied to the siloxane-containing surface of the cellulosic substrate.

It has been discovered that paper or other cellulosic substrates to be printed when treated so as to deposit on one of its surfaces a siloxane and/or copolymers of siloxane so as to be integral with said surface as by chemical bonding, have closer to ideal characteristics for runnability and printability. The deposition of siloxane and polysiloxanes by reactions with available hydroxyl groups in the cellulose and moisture that may be present converts these sites from hydrophilic to oleophilic centers. This enhances the pick-up of pigment and hence improves imaging. The reduction in surface tension provided by the treatment slows penetration by solvents used in printing inks and thus lessens strike-through, mottling, reduces ink usage, allows faster drying, while providing slight enhancement of lubricity which reduces linting and downtime associated with linting. Water resistance provided by the treatment reduces breaks attributable to loss of strength as the sheet becomes moist in web offset printing. Inhibition of capillary action provided by the treatment results in clearer imaging.

Moreover, sheet smoothness is unaffected by the treatment and the combination of improvements described above may be said to have as ameliorative an effect as improvement in smoothness. Nonetheless, for many grades of paper, it may still be deemed desirable to coat the cellulosic substrate so as to improve brightness, gloss and smoothness prior to the silane treatment.

DETAILED DESCRIPTION OF THE INVENTION

The deposition of siloxane and polysiloxanes onto the cellulosic substrate can be effected in any manner that forms siloxane and polysiloxane chemically bonded to the surface of the cellulosic substrate. One method comprises treating the cellulosic substrate with siloxanes modified to contain substituents reactive with the hydroxy groups of the cellulosic substrate as, for example, carboxyl, amino, halo and like reactive groups. A preferred method involves treating the cellulosic substrate with vapors of lower alkyl silicon halide, for example, by using the process described in U.S. Pat. No. 3,856,558 and U.S. Pat. No. 4,399,479 both of which are hereby incorporated by reference. This preferred method will be described in more detail below.

According to processes of the aforementioned patents, cellulosic materials having a moisture content of below 10% by weight, preferably below 7% by weight are contacted with the organosilicon halide. Cellulose materials having moisture contents in excess of 7% may be heated to remove surface moisture. Alternatively, such materials may first be frozen in accordance with the teachings of U.S. Pat. No. 4,339,479. A moisture content of up to about 7 weight percent in the cellulosic material is preferred in those instances wherein the cellulosic material is not contacted in its cold or frozen state.

The contact time of the cellulosic material and the organosilicon halide is in all cases sufficient to effect siloxane formation and will vary depending upon the temperature of the cellulosic material and organosilicon halide vapor, the concentration of the organosilicon halide in the contacting atmosphere, the pressure within the reaction zone and the moisture content of the cellulosic material. Contact times ranging from 0.1 second up to 2 seconds have been utilized successfully.

The temperature of the organosilicon halide is sufficiently high to effect reaction between the organosilicon halide and hydroxyl groups of the cellulosic material and any water present to form siloxane and/or polysiloxane within the claimed contact time but not so high as to degrade the cellulose at the contact time employed. Suitable temperatures range from 50° F., to about 200° F.

Generally, when employing higher temperatures, shorter contact times are employed and conversely, when employing relatively low temperatures, longer contact times can be employed. Furthermore, the concentration of the organosilicon halide in the atmosphere through which the cellulosic material is passed can be varied up to the saturation level of the atmosphere for the organosilicon halide and, if employed, a solvent for the organosilicon halide. The concentration of the organosilicon halide can range up to the saturation level of the atmosphere but should not be so low as to require excessive contact times in order to effect the desired reaction and to render the cellulosic material water-repellent. Typically, the concentration of the organosilicon halide ranges from about 2% volume percent up to the saturation level of the atmosphere within the reaction zone.

The reaction zone is normally maintained under a slight negative pressure during the treating operation but the pressure therein can vary widely say from as low as 1 Torr up to about 760 Torr.

When a cellulosic material having a moisture content of below 2 weight percent is employed pursuant to one aspect of the present invention the contact time must be increased and the variables of organosilicon halide vapor temperature, concentration, and the contact chamber pressure are maintained so that the final pH of the cellulosic material rendered water-repellent does not fall below 2.5 and preferably not below 3.5. The range of conditions which will ordinarily be employed will fall in the following ranges:

Temperature of organosilicon halide: 50° F. to 200° F.
Temperature of cellulosic material: frozen to 200° F.
Concentration of organosilicon halide: 2% to saturation Again, within the ranges set forth conditions are selected and maintained so that the final pH of the cellulosic material does not fall below 2.5.

The suitable organosilicon halides useful in this process are those commonly employed in water repellency treatments for cellulosic materials, such as those described by Patnode in U.S. Pat. No. 2,306,222, Norton, U.S. Pat. No. 2,412,470, and in my earlier U.S. Pat. Nos. 2,782,090, 2,824,778 and 2,961,338 which are incorporated herein by reference. Particularly suitable organosilicon halides are the lower alkyl silicon halides such as methylchlorosilanes, ethylchlorosilanes, butylchlorosilanes and propylchlorosilanes.

Typically, however, the silicon halides will be a mixture of dimethyldichlorosilane, $(CH_3)_2SiCl_2$; methyldichlorosilane, $CH_3SiHCl_2'$ and methyltrichlorosilane, $CH_3SiCl_3$ which may contain silicon tetrachloride, $SiCl_4$. The cellulosic material may be contacted with the vaporized organosilicon halide alone or together with a vaporized solvent for the organosilicon halide which solvent is inert both to the organosilicon halide and the paper being treated. It has been found that the presence of the solvent during the treatment step results in the formation of a treated cellulosic material having a higher pH as compared with a cellulosic material which is treated with the same organosilicon halide without the solvent under equivalent reaction conditions. Representative suitable solvents include toluene, xylene, hexane, perchloroethylene, fluorinated hydrocarbons, or other non-reactive solvents in which the organosilicon halide may be dissolved. It has been found that as little as 10 mole percent solvent is effective but that larger concentrations of the solvents in the range of about 12 to 100 mole percent based upon the total mole of the organosilicon halide and solvent are preferred. A molar quantity ten times or more that of the organosilicon halide is effective. If desired, higher concentrations of the solvent can be employed. However, the presence of excessive concentrations of solvent effects a reduction of reaction rate and increases the expense of the solvent without a significant beneficial effect.

The organosilicon halide or the mixtures of vapors or organosilicon halide in solvent may be formed by bubbling air through the liquid organosilicon halide or an admixture of the halide and solvent or more simply by dropping the liquid of the desired composition slowly onto a hot plate to generate vapors of the same molar composition as the liquid. Alternatively, an aerosol mixture may be employed as described in my U.S. Pat. No. 2,824,778 which is incorporated herein by reference. When employing a solvent having a significantly different vapor pressure than the organosilicon halide and when effecting vaporization by bubbling air, it is preferred that the solvent and organosilicon halide be maintained as separate liquids in order to better control the composition of the vapors formed in the treating chamber.

The air to be mixed with the organosilicon halide in the treatment step should contain as little water as possible to avoid significant reaction of water in the air with the organosilicon halide which results in the formation of hydrogen halide and reduction of the amount of organosilicon halide that can react with the cellulosic material.

In instances where the moisture content of the cellulosic material to be treated is greater than about 10 weight percent, it may be desirable to subject the cellulosic material to a drying step prior to the treatment with organosilicon halide. The drying step need only be conducted at a temperature and a time sufficient to remove part of the surface moisture from the material while retaining at least about 2 weight percent moisture in the material. Heating to about 250° F. for from about 3 to 5 seconds is sufficient in most cases. The desirability or necessity of this step will depend upon such factors as the prevailing humidity on the day of treatment, the uptake of moisture by the material during manufacture and storage and the conditions of treatment. If desired, the cellulosic material treated with organosilicon halide, either in the presence of or in the absence of a solvent, is further treated, upon removal from the organosilicon halide treating step, to remove hydrogen halide gas formed as by product of the reaction prior to a substantial portion of it becoming dissolved by moisture in the cellulosic material. Generally, the hydrogen halide gas removal can be effected by heating the cellulosic material, by applying suction to the cellulosic material or by passing the treated cellulosic material into contact with a moving stream of air.

The present invention is applicable to a cellulosic substrate such as substrates of paper, wallboard, wood, textiles and the like and includes all printing processes whereby printed matter is printed onto one or all surfaces of such substrates. Included are such printing processes as letterpress, offset lithography, gravure, web offset press and screen printing.

The inks or pigments used to print the printed matter images onto the treated surface of the cellulosic substrate can be any of the well known printing inks or pigments used on printing processes. Illustrative of such printing inks are the solvent-type inks, oleoresinous type inks, heat-set inks, steam set inks, newsprint inks, etc.

As aforementioned, the present invention contemplates coating the cellulosic substrate with conventional coating materials to improve smoothness, brightness, gloss, etc., prior to the silane treatment. Such coating materials are well known to those skilled in the art and include, for example, alum, clay, starch, resinous binders, etc.

The following examples are given to illustrate the invention and are in no way to be considered as limiting same.

EXAMPLE I

A sheet of newsprint having a basis weight of 30 lbs. and a moisture content of 4% by weight is exposed to vapors of methyltrichlorosilanes at room temperature and atmospheric pressure for 0.5 second. The sheet is subsequently heated for 10 seconds in an oven set at 300° F. to remove any residual HCl produced in the reaction. The sheet is then printed by web offset press using inks formulated for newspaper production. The sheet is found to have reduced linting, mottling, and strikethrough and better imaging.

In the preferred embodiment of the invention the paper would be treated continuously in a converting operation or at the point of manufacture, using an apparatus similar to that described in pending U.S. application Ser. No. 445,011 to Edward Robbart, filed Nov. 29, 1982, hereby incorporated by reference.

EXAMPLE II

A roll of groundwood paper having a basis weight of 16 lbs. and a moisture content of 5% by weight is exposed as described in Example I to vapors of methyltrichlorosilanes for 0.1 second and subsequently freed of residual HCl by suction. The roll is then sent through a gravure printing press at customary speeds using customary inks. The sheet prints well with reduction of strike-through so that the lighter basis weight is now comparable to a 24 lb. groundwood sheet.

EXAMPLE III

A roll of clay-coated bleached board having a moisture content of 6% by weight is sent through an apparatus similar to that described in pending U.S. application Ser. No. 445,011 and exposed to a mixture of silane vapors comprising by weight 10% methyldichlorosilanes and 90% methyltrichlorosilanes at room temperature and atmospheric pressure for 0.5 second. The roll is subsequently printed by letterpress. The ink pigment bonds better to the surface resulting in improved receptivity and reduced scuffing. The solvent in the ink is held out resulting in faster drying and greater efficiency of operation.

As the above examples illustrate, the present invention is suitable for a variety of printing techniques and paper grades. The concentration and formulation of the silanes and other conditions of treatment may be varied in accordance with the substrate and the properties desired.

It is claimed:

1. In printing cellulosic substrates wherein printing ink is printed onto at least one surface of said celluosic substrate, the improvement which comprises chemically bonding a modified reactive siloxane and polymers thereof to a surface of the substrate to form an oleophilic siloxane layer thereon, and impregnating the bonded layer with an ink selected from the group consisting of solvent inks, oleoresinous inks, heat set inks, steam set inks and newsprint inks to effect printing.

2. A process according to claim 1 wherein the cellulosic substrate is paper.

3. A process according to claim 1 wherein the cellulosic substrate is a textile material.

4. A process according to claim 1 wherein the deposit of siloxane and polymers thereof is formed by treating the surface with vapors of a lower alkyl silicon halide which reacts with hydroxyl groups of said cellulosic substrate.

5. A process according to claim 4 wherein said lower alkyl silicon halide comprises methylchlorosilane or a mixture of methylchlorosilanes.

6. A process according to claim 2 wherein the paper is newsprint.

7. A process according to claim 1 wherein the cellulosic substrate treated with said siloxane and said ink includes a coating selected from the group consisting of alum, clay, starch, and resinous binders.

8. An improved printed article of manufacture comprising a cellulosic substrate having a layer of oleophilic siloxane and polymers thereof chemically bonded to the substrate and an ink selected from the group consisting of solvent inks, oleoresinous inks, heat set inks, steam set inks and newsprint inks impregnating the siloxane layer.

9. An article of manufacture according to claim 8 wherein the cellulosic substrate is paper.

10. An article of manufacture according to claim 8 wherein the layer of siloxane and polymers thereof is formed by chemically bonding vapors of a lower alkyl silicon halide to hydroxyl groups on the surface of the substrate.

11. An article of manufacture according to claim 8 wherein the cellulosic substrate is a textile material.

12. An article of manufacture according to claim 10 wherein the lower alkyl silicon halide comprises methylchlorosilane or a mixture of methylchlorosilanes.

13. An article of manufacture according to claim 8 wherein the paper is newsprint.

14. An article of manufacture according to claim 10 wherein the cellulosic substrate treated with said vapors of alkyl silicon halide includes a coating selected from the group consisting of alum, clay, starch, and resinous binders.

* * * * *